No. 852,907. PATENTED MAY 7, 1907.
F. H. SAFFELL.
TRAP FOR BEEHIVES.
APPLICATION FILED APR. 21, 1906.
2 SHEETS—SHEET 1.
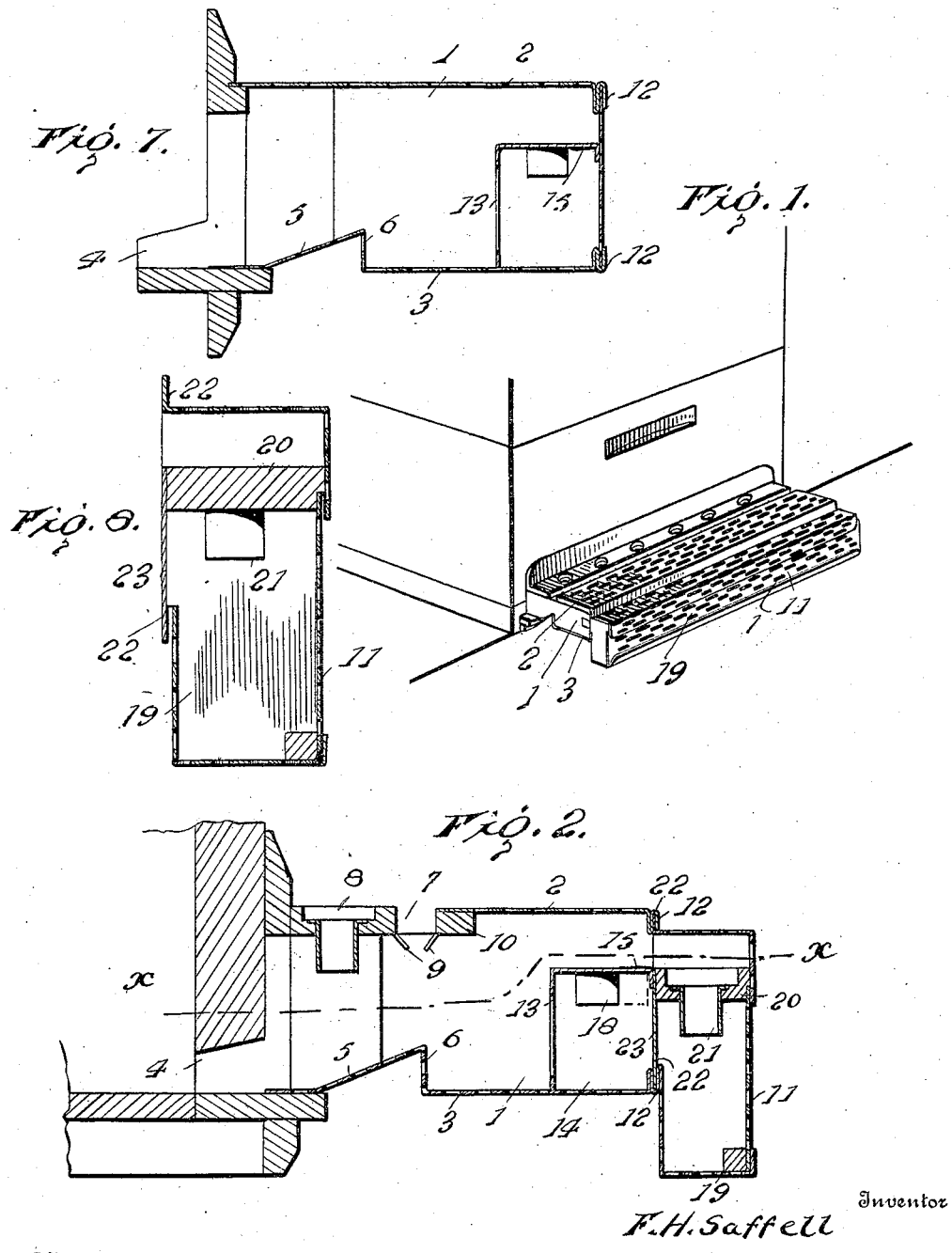
Witnesses
Inventor
F. H. Saffell
By
Racey, Attorneys

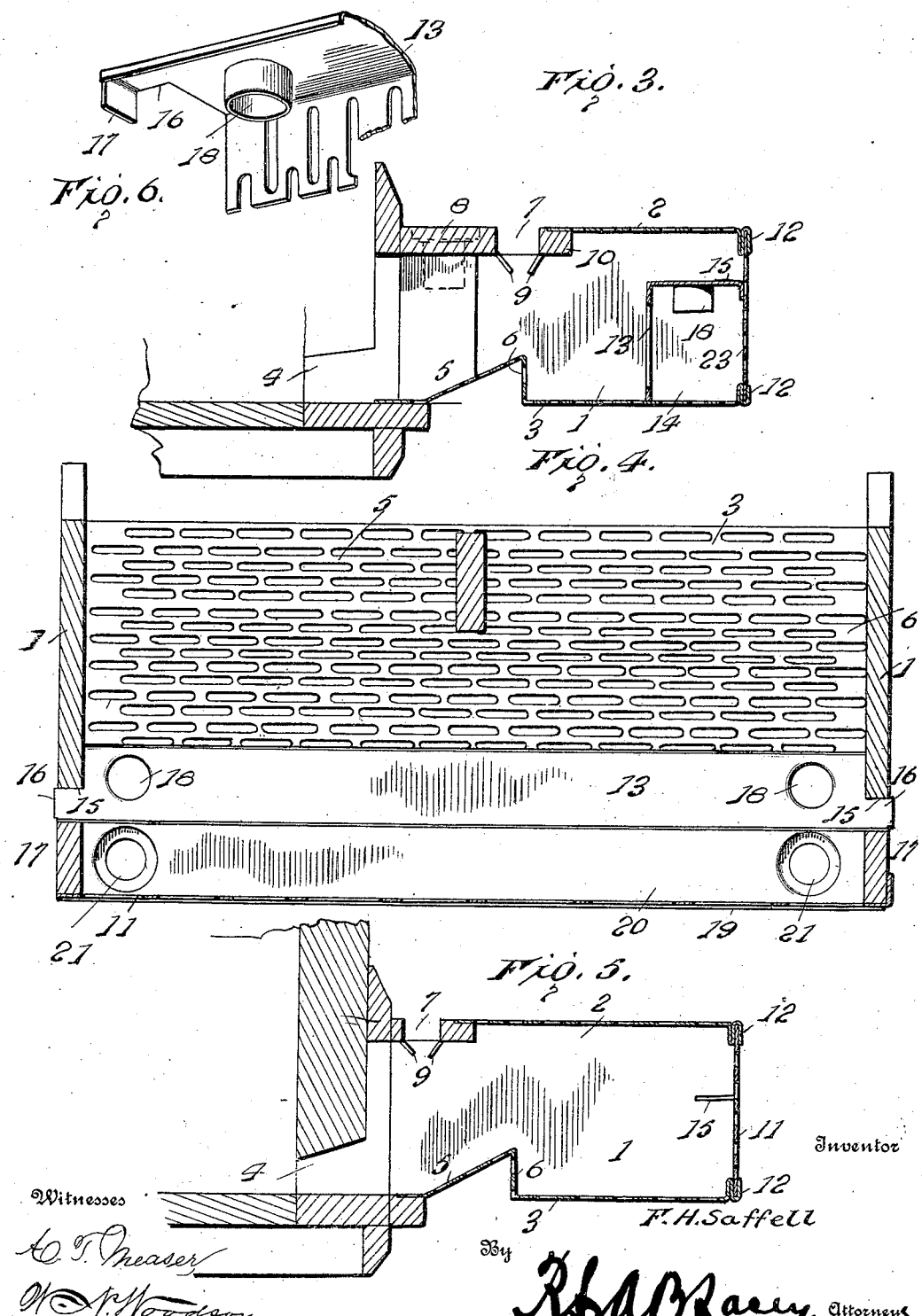

UNITED STATES PATENT OFFICE.

FRANK H. SAFFELL, OF GARFIELD, VIRGINIA.

TRAP FOR BEEHIVES.

No. 852,907.  Specification of Letters Patent.  Patented May 7, 1907.

Application filed April 21, 1906. Serial No. 313,035.

*To all whom it may concern:*

Be it known that I, FRANK H. SAFFELL, a citizen of the United States, residing at Garfield, in the county of Fairfax and State of Virginia, have invented certain new and useful Improvements in Traps for Beehives, of which the following is a specification.

The present invention appertains to traps for bee hives for limiting the freedom of the queen bee and to admit of catching the drones to dispose of them as may be required according to the extent of the colony and the stores on hand.

The purpose of the invention is to devise a trap which will offer a minimum amount of resistance to the entrance into the hive of the worker bees when returning laden with nectar or honey, and which will admit of restricting the freedom of the queen bee, either to the trap, only, or to the hive and trap, and which will confine the drones and admit of their destruction if desired without necessitating the entire removal of the device from the hive.

For a full description of the invention and the merits thereof and also to acquire a knowledge of the details of construction of the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a trap embodying the invention, showing a portion of a hive having the trap fitted thereto. Fig. 2 is a transverse section of the trap and a portion of the hive on a larger scale. Fig. 3 is a transverse section similar to Fig. 2 with the supplemental trap removed. Fig. 4 is a horizontal section on the line x—x of Fig. 2. Fig. 5 is a transverse section of a modification having the trap partition removed. Fig. 6 is a perspective view of the end portion of the trap partition. Fig. 7 is a section similar to Fig. 3 of a modification, the guarded entrances being omitted. Fig. 8 is a cross section of the supplemental trap on a larger scale.

Corresponding and like parts are referred to in the following description and indicated in all the views of the drawings by the same reference characters.

The trap, in general appearance, is oblong and of box-like form, the longitudinal sides being preferably of sheet metal having openings or slots formed therein of a size to admit of ingress and egress of the worker bees, while at the same time confining the queen bee and drones.

The trap comprises end pieces 1, a top 2 and a bottom 3, the end pieces having extensions 4 at one end to enter the opening of the hive to retain the device in place when fitted thereto. The end pieces 1 are usually of wood, whereas the top 2 and bottom 3 are of sheet metal, such as commonly provided in attachments of this kind for use in connection with bee hives. A portion of the bottom 3 is upwardly deflected to form an incline 5 and a shoulder 6, the latter preventing dead bees from obstructing the entrance to the hive, whereas the incline 5 admits of the dead bees being dragged therefrom to be dropped in front of the shoulder 6. The top 2 may be continuous, as shown in Fig. 7, or may be interrupted and provided with guarded entrances 7 and 8, the latter consisting of tubes pendent from the top and the former consisting of a slot having a series of downwardly converged pins 9 arranged upon its opposite sides. The guarded entrances are provided upon a board or plate 10 forming a continuation of the inner portion of the top 2. The tubes pendent from the guarded openings 8 are flanged at their upper ends and are dropped into openings bored in the part 10, the upper ends of said openings being enlarged to receive the flanges of the tubes and to facilitate the entrance of the bees. The inner side of the trap is usually left open to establish unobstructed communication with the entrance opening of the hive. The outer side of the trap is closed by means of a slide 11, which is slipped into guides 12 formed by folding or bending outer longitudinal edge portions of the sides 2 and 3. The bending and rebending or folding of the outer edge portions of the parts 2 and 3 stiffens and reinforces the same in addition to providing the guides 12 to receive the slide 11.

The trap proper is located in the outer lower portion of the box-like structure or frame of the trap and is formed by a trap partition 13 consisting of a plate bent upon itself intermediate of its longitudinal edges to form angularly disposed wings, the lower edge of the vertical wing touching the bottom 3 and the outer edge of the horizontal wing coming close to the front of the frame or box so as to meet the slide 11 or inner wall of the supplemental trap and form the compartment 14 into which the queen bee or drones are confined when trapped. The end pieces 3 have cuts 15 extended inward a short distance from their outer edges to receive terminal extensions 16 of the trap partition so as to retain the latter in place. The extensions 16 are located near the outer corners of the horizontal wing of the trap partition, the ends of said extensions 16 being bent to provide lips 17 which embrace the outer sides of the end pieces 3 so as to prevent longitudinal movement of the trap partition. The trap partition 13 is readily removable, the extensions 16 being freely slidable in and out of the cuts 15. The lips 17 do not in any manner interfere with the removability of the trap partition, but serve simply to prevent appreciable longitudinal play thereof when the partition is slipped into place. The horizontal wing or portion of the trap partition is plain and devoid of openings or slots, whereas the vertical portion is slotted or formed with openings of a size corresponding to the openings or slots formed in the top and bottom of the main structure or frame to admit of free ingress and egress of the worker bees. Guarded openings 18 are provided in the horizontal portion of the trap partition to admit of the queen bee and drones passing therethrough, but preventing their exit from the compartment 14 because of the peculiarity of the bees not to crawl downward and around the lower ends of the tubes pendent from the openings 18 and thence upward through said openings, the latter being of a size to prevent the bees passing therethrough on the wing. When the trap partition is removed the queen bee and drones have unobstructed passage between the hive and main frame or structure, as indicated most clearly in Fig. 5, but when the partition is in place, the queen bee and drones entering the compartment 14 through the guarded openings 18 are confined to be disposed of as may be desired. The guarded openings 8 may be dispensed with, as shown in Fig. 5, and the board 10, together with the guarded openings 7 and 8, may be omitted and the slotted plate 2 continuous from front to rear of the structure, as shown in the modification illustrated in Fig. 6.

A supplemental trap 19 forms a part of the device and is removable to admit of disposing of the trapped bees without necessitating the removal of the entire structure from the hive. The supplemental trap comprises a frame or structure of box-like formation and comprising end pieces, preferably of wood, and sides of slotted sheet metal such as employed in the formation of the main structure or frame. The horizontal partition 20 is arranged close to the top of the frame or structure of the supplemental trap and divides the same into upper and lower compartments, the latter forming the trap proper, whereas the former constitutes an entrance thereto. The partition 20 is preferably of wood and is provided at intervals with guarded openings 21 similar to the guarded openings 8 and designed to admit of the queen bee and drones passing into the trap 19. The front side of the trap 19 is closed by the slide 11 when the supplemental trap is in position, said slide being removed from the guides 12. Vertically arranged flanges 22 provided at the rear of the supplemental trap are adapted to coöperate with the guides 12 and retain the supplemental trap in position. The upper flange 22 is formed by bending a longitudinal edge portion of the top of the frame in an upward direction, whereas the lower flange 22 is formed by the lower edge portion, a plate 23 forming the upper portion of the rear side of the structure, said plate forming the front wall of the compartment 14 when the supplemental trap is in position and preventing direct passage from the main and the supplemental traps. When it is required to move the supplemental trap a slide 11 is slipped into the guides 12 as the supplemental trap is withdrawn from said guides, and when the supplemental trap is removed, the structure has the appearance as shown in Fig. 3.

Having thus described the invention, what is claimed as new is:

1. In a trap device for bee hives, the combination of a box-like structure having cuts extended inwardly from the outer edges of its opposite ends, and a removable trap partition having end extensions freely slidable into and out of said cuts and adapted to secure the trap partition when slipped into place.

2. In a trap device for bee hives, the combination of a box-like structure having inwardly extended cuts in opposite ends, and a trap partition having end extensions to slide into said cuts and retain the trap partition in place, said end extensions having their outer terminal portions bent to provide flanges to embrace outer sides of the end pieces to prevent longitudinal movement of the trap partition.

3. In a trap device for bee hives, the combination of a box-like structure and a removable trap partition arranged therein to provide a confining compartment or to admit of unobstructed passage between the hive and all portions of the box-like structure, said partition comprising angularly disposed wings which, with corresponding sides of the structure, form inclosing walls of the trap compartment.

4. In a trap device for bee hives, the combination of a box-like structure, a removable trap partition provided in its top side with entrance openings, and inner smooth-faced tubes pendent from said openings to admit of the bees dropping therethrough, but preventing their exit therethrough.

5. A trap device for bee hives, the same comprising a box-like structure having its outer side open, a trap partition removably fitted within the structure through the open side thereof and comprising angularly disposed wings, and means for closing the open side of said structure as well as the open side of the trap partition and retaining the latter in place.

6. A trap device for bee hives comprising a box-like structure having its front side open, a supplemental trap slidably fitted to the open side of the main structure and having its front side open, and a slide adapted to close either the open side of the main structure or the open side of the supplemental trap.

7. A trap device for bee hives comprising a main box-like structure and a supplemental box structure removably fitted thereto, an imperforate wall separating the lower portion of the main structure from the supplemental structure, the two structures having unobstructed intercommunication at their upper portions.

8. In a trap device of the character specified, the combination of a main box-like structure having an opening in its front side, a removable trap partition forming a compartment adjacent to said open side, a supplemental box-like structure removably fitted to the main side of the box-like structure and separated from the compartment inclosed by the trap partition by means of an imperforate plate, and a partition subdividing the supplemental structure into upper and lower compartments, the upper compartment having free communication with the upper portion of the main structure, and said partition being provided with guarded openings.

In testimony whereof I affix my signature in presence of two witnesses.

FRANK H. SAFFELL. [L. S.]

Witnesses:
   V. B. HILLYARD,
   J. D. YOAKLEY.